United States Patent
Agrawal et al.

(10) Patent No.: US 12,555,073 B2
(45) Date of Patent: Feb. 17, 2026

(54) TIME-DISTRIBUTED DELIVERY BASED ON USER CONSUMPTION RATE

(71) Applicant: INTERNATIONAL BUSINESS MACHINES CORPORATION, Armonk, NY (US)

(72) Inventors: Tushar Agrawal, West Fargo, ND (US); Jeremy R. Fox, Georgetown, TX (US); Uri Kartoun, Cambridge, MA (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 18/159,419

(22) Filed: Jan. 25, 2023

(65) Prior Publication Data
US 2024/0249240 A1    Jul. 25, 2024

(51) Int. Cl.
*G06Q 10/087* (2023.01)
*G06Q 10/083* (2024.01)
*G06Q 30/0201* (2023.01)

(52) U.S. Cl.
CPC ......... *G06Q 10/087* (2013.01); *G06Q 10/083* (2013.01); *G06Q 30/0201* (2013.01)

(58) Field of Classification Search
CPC . G06Q 10/087; G06Q 10/083; G06Q 30/0201
USPC ........................................................ 705/28
See application file for complete search history.

(56) References Cited

U.S. PATENT DOCUMENTS

| | | | |
|---|---|---|---|
| 8,560,461 B1 | 10/2013 | Tian | |
| 10,430,846 B2 | 10/2019 | Psota | |
| 10,720,068 B2 | 7/2020 | Raptopoulos | |
| 10,817,885 B2* | 10/2020 | Concannon | ........ G06Q 30/0202 |
| 11,373,138 B2 | 6/2022 | Barr | |
| 12,141,853 B2* | 11/2024 | Fredrich | ................ H04W 4/14 |
| 2007/0011017 A1 | 1/2007 | Field | |

(Continued)

OTHER PUBLICATIONS

Disclosed Anonymously, "Method and System for Dynamic Prioritization for Online Ordering," IP.com, IP.com No. IPCOM000265686D, IP.com Publication Date: May 5, 2021, 9 pages.

(Continued)

*Primary Examiner* — Garcia Ade
(74) *Attorney, Agent, or Firm* — Michael O'Keefe

(57) ABSTRACT

According to an embodiment, shipment splitting and variable delivery is provided. The embodiment may include identifying a consumption rate of a user for an item. The embodiment may also include identifying one or more future user locations. The embodiment may further include calculating a consumption quantity of the item at each location based on the identified consumption rate. The embodiment may also include calculating a usage time and date at which each calculated quantity is needed by a user at each location. The embodiment may further include calculating a shipment time for each quantity to be received at each location by each calculated usage time and date. The embodiment may also include performing one or more shipments, at each calculated shipment time, of packages, each containing a quantity of the item based on each calculated consumption quantity, to each location corresponding to each calculated consumption quantity.

20 Claims, 2 Drawing Sheets

(56) References Cited

U.S. PATENT DOCUMENTS

| | | | |
|---|---|---|---|
| 2019/0138976 A1* | 5/2019 | Essenmacher | G06Q 10/087 |
| 2020/0293979 A1 | 9/2020 | Sheets | |
| 2023/0316220 A1* | 10/2023 | Bifolco | G06Q 30/0635 |
| | | | 705/28 |

OTHER PUBLICATIONS

Disclosed Anonymously, "Proactive Detection and Prevention of Stockpiling Orders for an Efficient Supply Chain," IP.com, IP.com No. IPCOM000264955D, IP.com Publication Date: Feb. 10, 2021, 6 pages.

Disclosed Anonymously, "System and Method to Optimize Food/Goods Delivery with Usage Personalization," P.com, IP.com No. IPCOM000261672D, IP.com Publication Date: Mar. 26, 2020, 8 pages.

Hare, 7 Questions Retailers Should Ask about Split Shipments—Turn this fulfillment challenge into a brand asset, Fluent Commerce, Jul. 9, 2020, https://fluentcommerce.com/7-questions-retailers-should-ask-about-split-shipments/, 9 pages.

IBM, "Build smarter supply chains with AI and blockchain," IBM.com, Accessed: Oct. 7, 2022, https://www.ibm.com/supply-chain, 10 pages.

IBM, "Combining or splitting an order line," IBM.com, Accessed: Oct. 7, 2022, https://www.ibm.com/docs/en/order-management-sw/9.2.1?topic=solution-combining-splitting-order-line, 2 pages.

IBM, "How to split the backordered quantity in the order to a new line during scheduling in Sterling Order Management?" IBM.com, Accessed: Oct. 7, 2022, https://www.ibm.com/support/pages/how-split-backordered-quantity-order-new-line-during-scheduling-sterling-order-management, 2 pages.

IBM, "IBM Sterling Fulfillment Optimizer with Watson—Overview," IBM.com, Accessed: Oct. 7, 2022, https://www.ibm.com/docs/en/fulfillmentoptimizer?topic=overview, 3 pages.

IBM, "IBM Sterling Fulfillment Optimizer with Watson," IBM.com, Accessed: Oct. 7, 2022, https://www.ibm.com/products/fulfillment-optimizer, 7 pages.

IBM, "IBM Sterling Fulfillment Optimizer with Watson: Details," IBM.com, Accessed: Oct. 7, 22, https://www.ibm.com/products/fulfillment-optimizer/details, 6 pages.

IBM, "IBM Sterling® Order Management," IBM.com, Accessed: Oct. 7, 2022, https://www.ibm.com/products/order-management, 11 pages.

Lopienski, Split Shipments: Why They're Used & Common Examples, ShipBob, Apr. 29, 2020, https://www.shipbob.com/blog/split-shipments/, 12 pages.

* cited by examiner

TIME-DISTRIBUTED DELIVERY BASED ON USER CONSUMPTION RATE

BACKGROUND

The present invention relates generally to the field of computing, and more particularly to logistics.

Logistics relates to the planning, implementation, and control of movement of goods and materials from one location to another. Typically, transportation, storage, and handling of goods are included under the purview of logistics as well as the coordination of all aspects and activities related to a supply chain. Additionally, logistics relates to information flow management and process coordination between entities including, but not limited do, suppliers, distributors, customers, and manufacturers. The primary goal of logistics is to ensure that items, namely the correct items, arrive at a destination location in the most efficient time by the most cost-effective manner.

SUMMARY

According to one embodiment, a method, computer system, and computer program product for shipment splitting and variable delivery is provided. The embodiment may include identifying a consumption rate of a user for an item. The embodiment may also include identifying one or more future user locations. The embodiment may further include calculating a consumption quantity of the item at each location based on the identified consumption rate. The embodiment may also include calculating a usage time and date at which each calculated quantity is needed by a user at each location. The embodiment may further include calculating a shipment time for each quantity to be received at each location by each calculated usage time and date. The embodiment may also include performing one or more shipments, at each calculated shipment time, of packages, each containing a quantity of the item based on each calculated consumption quantity, to each location corresponding to each calculated consumption quantity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
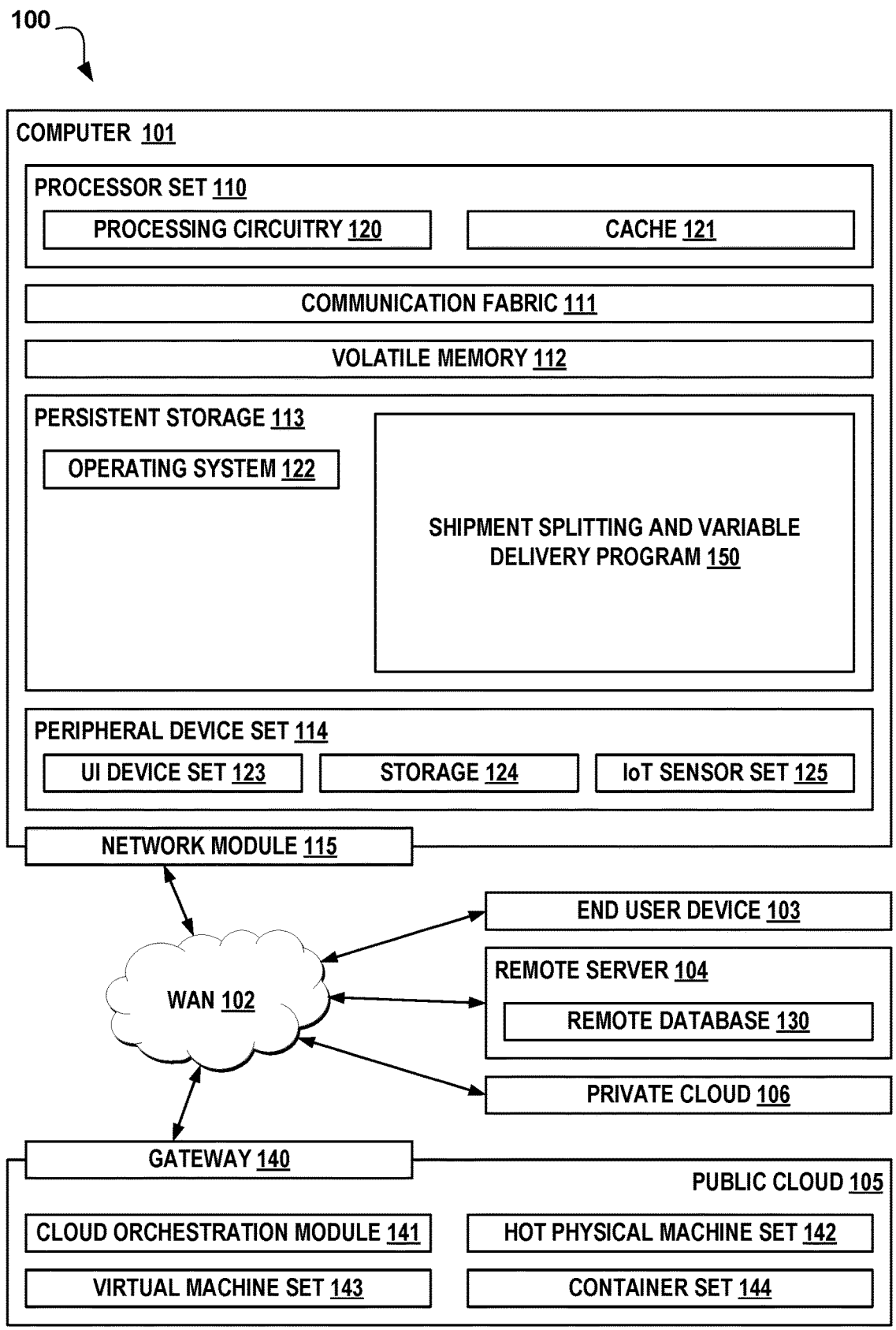
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to logistics. The following described exemplary embodiments provide a system, method, and program product to, among other things, analyze user consumption patterns and locations to determine appropriate order shipping quantities and destinations. Therefore, the present embodiment has the capacity to improve the technical field of logistics by optimizing warehouse storage quantities as well as ensuring supply meets demand for specific items through ensuring shipment of items conforms to need according to the user consumption pattern.

As previously described, logistics relates to the planning, implementation, and control of movement of goods and materials from one location to another. Typically, transportation, storage, and handling of goods are included under the purview of logistics as well as the coordination of all aspects and activities related to a supply chain. Additionally, logistics relates to information flow management and process coordination between entities including, but not limited do, suppliers, distributors, customers, and manufacturers. The primary goal of logistics is to ensure that items, namely the correct items, arrive at a destination location in the most efficient time by the most cost-effective manner.

Split shipments relate to the separation of a single shipment of an item or items into multiple shipments. The shipped items are still sent to the destination location as intended, however, arrival of the shipped items is completed in more than a single package and/or delivery. Despite the desire to avoid split shipments under many situations due to definitional inefficiencies, extenuating circumstances may warrant the use of split shipments. For example split shipments, typically, are utilized under various situations including, but not limited to, when an item being shipped is too large for shipment under standard conditions, if items are being shipped from more than a single location, or shipment to different destination locations is desired. Additionally, panic situations or a scared state of mind, such as unusually extreme weather in a forecast (e.g., hurricane), supply chain issues, economic or geopolitical unrest, and global health emergencies, may result in over purchase of goods from suppliers. Furthermore, an individual may desire a longer consumption time between shipments due to travel or a desire for fewer shipments to their location(s). As such, it may be advantageous to, among other things, utilize a delivery system that identifies specific quantities into which a shipment can be split based on a user consumption rate, times at which those quantities may be needed or desired, and locations at which to ship the quantities to ensure arrival by the identified times.

According to one embodiment, a shipment splitting and variable delivery program may analyze user consumption behavior in different locations over a period of time based on data provided by the customer, such as location(s), time spent at the location(s), storage space and type of storage available, and combination of products typically consumed together. Furthermore, the shipment splitting and variable delivery program may analyze user purchasing patterns to predict how an order should be split and delivered to the user in different locations to align with the consumption needs of the user and individuals for whom the user purchases (e.g., family members, roommate(s), etc.). Additionally, the shipment splitting and variable delivery program may identify warehouse shipping locations based on the item availability and where an item should be shipped and, accordingly, optimize the shipment with a mix of products based on the predicted user consumption needs and delivery cycles. The shipment splitting and variable delivery program may further learn user purchasing and consumption patterns and proactively break/split user "shopping carts" based on the learned data.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as shipment splitting and variable delivery program 150. In addition to shipment splitting and variable delivery program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and shipment splitting and variable delivery program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in shipment splitting and variable delivery program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in shipment splitting and variable delivery program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the shipment splitting and variable delivery program 150 may monitor user online activities to determine when a user is about to fulfill an order for the delivery of one or more consumable items. The shipment splitting and variable delivery program 150 may then calculate a prediction as to the consumption during when an item is ordered in bulk and, according, may split ship the bulk item in different quantities and on different time frames so that receipt of the bulk item(s) is in accordance with the user's calculated consumption rate. Additionally, the shipment splitting and variable delivery program 150 may identify if the user will consume the item over more than one location and, if so, base the split shipment of the order across each location based on predicted dates and times over which the user will be present at each location as well as each location's necessity for having the item present for user consumption. The shipment splitting and variable delivery program 150 may also determine available infrastructure and available storage for the user at each location, such as adequate space freezer space or cooling space, and split shipments so as to stagger delivery according to the available infrastructure and storage. Similarly, the shipment splitting and variable delivery program 150 may consider available warehouse inventory and warehouse locations when determining split shipments from each warehouse. Furthermore, notwithstanding depiction in computer 101, the shipment splitting and variable delivery program 150 may be stored in and/or executed by, individually or in any combination, end user device 103, remote server 104, public cloud 105, and private cloud 106. The shipment splitting and variable delivery method is explained in more detail below with respect to FIG. 2.

Figure 2:
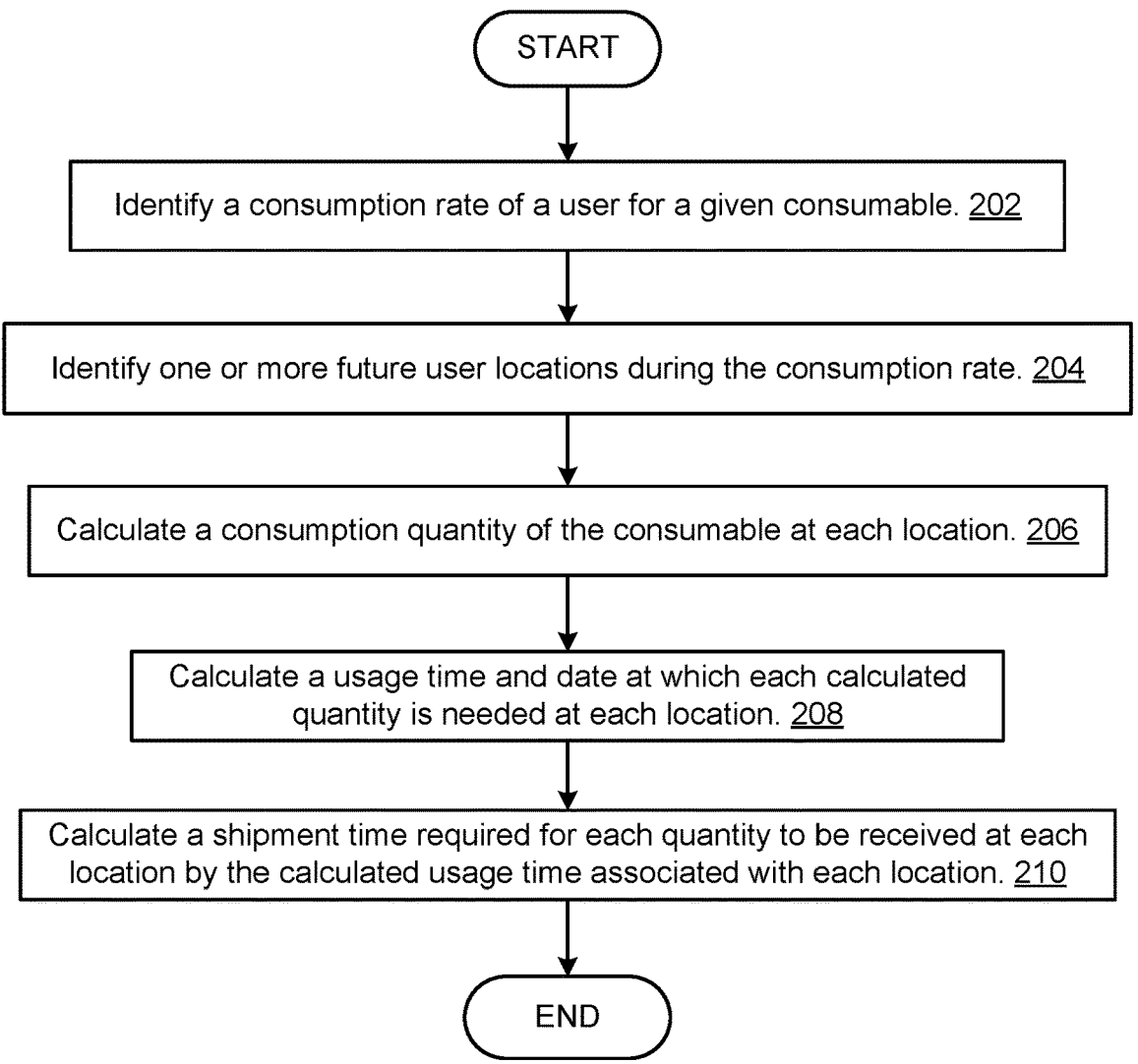
FIG. 2 illustrates an operational flowchart for a shipment splitting and variable delivery process according to at least one embodiment.

Referring now to FIG. 2, an operational flowchart for a shipment splitting and variable delivery process is depicted, according to at least one embodiment. At 202, the shipment splitting and variable delivery program 150 identifies a consumption rate of a user for a given consumable. The shipment splitting and variable delivery program 150 may ingest historical consumption pattern data related to a user or a user group, such as a family or roommates, to identify a consumption pattern, or consumption rate, for the user or user group. The consumption rate may relate to the amount of any given item or items which the user or user group consumes in a given period of time. For example, a family of four may consume one 12-count package of paper towels in one month. In such a situation, the shipment splitting and variable delivery program 150 may determine the consumption rate for a 12-count package of paper towels is one month, or approximately one roll per three or four days. In at least one embodiment, the shipment splitting and variable delivery program 150 may calculate a fractional or partial figure for the consumption rather. For example, usage of a 12-count package of paper towels may be calculated as 2.58 days per roll in a 31-day month. The shipment splitting and variable delivery program 150 may gather the consumption data through one or more of a variety of analytical and data gathering methods such as, but not limited to, analyzing user purchase habits and user disposal and item usage habits through Internet of Things (IoT) feeds within a user residence.

The shipment splitting and variable delivery program 150 may identify the user purchase habits through gathering of data, perhaps through an application programming interface (API), from an enterprise loyalty application. For example, shipment splitting and variable delivery program 150 may interface with a local retailer to determine user purchases during each user visit to the retailer. The local retailer may gather the user purchase habits through a loyalty and/or rewards program and may such data available to the shipment splitting and variable delivery program 150. For example, the shipment splitting and variable delivery program 150 may determine that a family purchases packages of paper towels once per month based on item purchase data from a grocery retailer at which the family shops weekly.

The shipment splitting and variable delivery program 150 may utilize IoT feeds captured by sensors, such as IoT device set 123, associated with available smart devices within a user residence to determine user usage and disposal habits. For example, a smart refrigerator may determine usage of a gallon of milk throughout a given period of time by identifying when the milk container is removed from storage, returned to storage, and the amount used while outside of storage. Furthermore, the shipment splitting and variable delivery program 150 also identify usage through an existing in-home camera surveillance system installed by the user. Such a system may track user item usage throughout the user residence. For example, the shipment splitting and variable delivery program 150 may determine a user taking one roll of paper towels out of a storage closet every three or four days as an indication the user, or user group, consumes one roll of paper towels every three or four days, or that each roll lasts 2.58 days on average.

Next, at 204, the shipment splitting and variable delivery program 150 identifies one or more future user locations during the consumption rate. The shipment splitting and variable delivery program 150 may gather user itinerary information from one or more repositories, such as storage 124 or remote database 130, to determine the current user location and/or one or more future user locations as well as the length of time for which the user will stay at each location. For example, the shipment splitting and variable delivery program 150 may gather calendar information from a third-party calendar application to determine that the user will be at a home residence for the next two days but will then travel to a convention for four days before returning to the user home residence. The shipment splitting and variable delivery program 150 may also identify the type of location associated with each location within the itinerary information. For example, the user home residence may be classified as a house or apartment type whereas user travel to a convention may be a hotel room, hotel suite, or rented residence.

In at least one embodiment, the shipment splitting and variable delivery program 150 may further analyze the type of each user location to identify the infrastructure of each location so as to fully calculate the consumption quantity of a consumable at each location, as discussed below in step 206. Since each location and location type has different requirements and restrictions, the shipment splitting and variable delivery program 150 may calculate a different consumption quantity for a consumable at each location. For example, a hotel room may be equipped with a mini refrigerator whereas a rented house may have a full-size refrigerator. Additionally, certain location types may provide amenities that may alter the needed consumption quantity. For example, hotels typically provide tissues as a complimentary amenity of a guest's stay. However, a vacation cabin owned by the user may not always be stocked with tissues and require supplementation or continued purchase. Therefore, the shipment splitting and variable delivery program 150 may determine that the consumption quantity with which a shipment can be split will be smaller for a hotel room location than it can be for a rented house location or a user-owned property.

Then, at 206, the shipment splitting and variable delivery program 150 calculates a consumption quantity of the consumable at each location. The shipment splitting and variable delivery program 150 may calculate the consumption quantity for a specific item at each location using the previously identified consumption rate for the item, the amount of time the user, or user group, is scheduled to remain at each location, and the location type. For example, in the previous scenario, where a family's consumption rate for paper towels is determined to be 2.58 days per roll per roll and the user is at their home residence for a week before traveling to a user-owned vacation property for the next three weeks, the shipment splitting and variable delivery program 150 may calculate the consumption quantity at the home residence as seven rolls, or about a quarter of a consumption rate, and the consumption quantity at the vacation property as 21 rolls, or about three-quarters of a consumption rate.

Once the shipment splitting and variable delivery program 150 calculates specific quantities, the shipment splitting and variable delivery program 150 may split a user online "shopping cart" of a particular order based on the calculated quantities, predicted locations, and length of time at each location. For example, continuing the above situation, the shipment splitting and variable delivery program 150 may separate a single order for a 12-count paper towels order into two orders of a 4-count package and a 8-count package, or any other equivalent combination of available packages, so that the calculated consumption quantities are satisfied to an optimal extent. Despite this example describing the splitting of an online "shopping cart" into two distinct orders, the shipment splitting and variable delivery program 150 may utilize any number of divisions of a shopping cart based on one or more of the total calculated quantities, available manufacturer packaging sizes or amounts, warehouse storage space, overall current and/or predicted future consumer demand, current and/or future user location storage space, and current and/or future user location item inventory.

In one or more other embodiments, the shipment splitting and variable delivery program 150 may determine the value of the consumption quantity in any variety of types, such as consumption rate, item volume, item weight, item mass, item count, amount of time, or serving size amount. For example, continuing the previous example related to paper towels as the consumable, the shipment splitting and variable delivery program 150 may calculate the consumption quantity in the consumption rate; item volume, such as cubic inches; item weight, such as ounces, or pounds; item mass, such as grams or kilograms; item count, such as rolls or sheets of paper towels; amount of time, number days based on user's historical usage of the item; or serving size or amount, such as a typical amount consumed by the user in one sitting or a manufacturer recommended amount per use or serving size, in a food related example.

The shipment splitting and variable delivery program 150 may be capable of calculating the storage capacity for each consumable in each location depending on the repositories available. For example, the shipment splitting and variable delivery program 150 may utilize a third-party repository, such as a real estate database or an enterprise website, to determine whether a location has certain amenities and the amount of storage available for each amenity. In situations where the shipment splitting and variable delivery program 150 is unable to obtain such information, the shipment splitting and variable delivery program 150 may prompt the user to provide the infrastructure of each location manually. For example, if the user is visiting a rural cabin rented from a friend and the shipment splitting and variable delivery program 150 is unable to identify whether the cabin has a refrigerator, the shipment splitting and variable delivery program 150 may prompt the user to indicate the presence of a cold storage appliance and the storage amount of that appliance.

Next, at 208, the shipment splitting and variable delivery program 150 calculates a usage time and date at which each calculated quantity is needed at each location. The shipment splitting and variable delivery program 150, using the one or more future locations, may determine when a user is likely to use the consumable. For example, if the user has a bowl of cereal each morning for breakfast, the shipment splitting and variable delivery program 150 may determine the usage time is daily at a user-specific time, such as 7:00 A.M. The shipment splitting and variable delivery program 150 may also determine specific dates on which a consumable may be needed. For example, continuing the previous example, if the user will be traveling to a convention in two days, the shipment splitting and variable delivery program 150 may determine that the user will desire cereal at 7:00 A.M. on the first morning of the scheduled convention. However, if the consumable is shampoo and the user typically showers in the evening on alternating days, the shipment splitting and variable delivery program 150 may determine that the user does not require shampoo until the second day of the convention assuming the user is at a location that does not provide shampoo, such as a rented house.

Furthermore, the shipment splitting and variable delivery program 150 may consider the user's current inventory amount of a given consumable in storage when determining the usage time at which each calculated quantity is needed at each location. For example, if the user is remaining at a home residence and the shipment splitting and variable delivery program 150 determines the user has two boxes of the same type of cereal currently in storage, the shipment splitting and variable delivery program 150 may determine that the usage time at which additional cereal will be needed is in two weeks based on the previously described one week consumption rate. Similarly, the shipment splitting and variable delivery program 150 may determine the user has three rolls of paper towels remaining in storage at their home residence. The shipment splitting and variable delivery program 150 may determine, based on historical usage being 2.58 days per roll for the user's family, that the user will require additional paper towels in about seven days. The shipment splitting and variable delivery program 150 may perform this calculation and prediction at the current user location and each future user location on the user's itinerary within a preconfigured time period. For example, continuing the earlier situation where the user will be at their home residence for a week before traveling to a user-owned vacation cabin for three weeks, the shipment splitting and variable delivery program 150 may calculate the inventory of paper towels at the user residence and the vacation cabin then make a prediction on when the user will require additional paper towels based on the length of stay at each location according to the user itinerary.

Then, at 210, the shipment splitting and variable delivery program 150 calculates a shipment time required for each quantity to be received at each location by the calculated usage time associated with each location. The shipment splitting and variable delivery program 150 may weigh the previously calculated consumption quantity at each location and calculated usage time and date at each location to finally calculate a shipment time for each quantity to be shipped to each location. The shipment splitting and variable delivery program 150 may also integrate a predicted length of delivery for a courier to receive the item(s) from the shipment facility until the courier delivers the item(s) at the destination location(s). Factoring in this calculated delivery time and the predicted usage time and date, the shipment splitting and variable delivery program 150 may calculate the estimated shipment time and date for the calculated quantity of each item to arrive at the destination location by the predicted usage time. For example, continuing the previous example, when a user orders a month's worth of paper towels, the shipment splitting and variable delivery program 150 may determine a 12-count package of paper towels is typically shipped to the user's home residence. However, the shipment splitting and variable delivery program 150 may determine, based on the user's itinerary and/or calendar, that the user's family will leave for a vacation to their second property in a week and remain at the second property for three weeks. Based on this forecast information, the shipment splitting and variable delivery program 150 may calculate that the user's family requires three rolls of paper towels at their home residence for the upcoming week and nine rolls of paper towels at their vacation property for their three week stay since the shipment splitting and variable delivery program 150 may also determine that no paper towels remain in storage at the property. The shipment splitting and variable delivery program 150 may also determine that standard shipment times to the user home residence is same day due to the home residence's proximity to a distribution warehouse but the vacation property take approximately three days due to that property's more remote location. Therefore, the shipment splitting and variable delivery program 150 may calculate that a three-roll, or equivalently sized, package of paper towels should be shipped to the user home residence immediately and that a nine-count, or equivalently sized, package of paper towels should be shipped to the vacation property in four days' time so that the nine-count package is received at the vacation property at or before the user's arrival.

It may be appreciated that FIG. 2 provides only an illustration of one implementation and does not imply any limitations with regard to how different embodiments may be implemented. Many modifications to the depicted environments may be made based on design and implementation requirements. For example, in at least one embodiment, the shipment splitting and variable delivery program 150 may perform the shipment splitting and variable delivery process 200 after a user places an order for a specific item. However, in at least one other embodiment, the shipment splitting and variable delivery program 150 may regularly perform shipment splitting and variable delivery process 200 based on a recurring user order or subscription service so that any shipped items are received in appropriate quantities at each location the user may require the specific item.

Furthermore, in one or more embodiments, prior to any data gathering efforts, the shipment splitting and variable delivery program 150 may require each user to opt-in to the gathering of any data necessary to calculate and/or identify the user or user group consumption rate, current user location, future user location(s), length of time at each location. Such an opt-in process may be presented to the user upon initial installation of the shipment splitting and variable delivery program 150 and indicate which items of data will be gathered, the intended use of each item of data, and the length of time for which the item of data will be stored.

Additionally, shipment splitting and variable delivery program 150 may split larger single orders into smaller orders based on historical knowledge about two or more users split across two or more locations, such as when ordering supplies for a multi-location organization. For examples, if office supplies are being ordered for two or more branches of an organization, the shipment splitting and variable delivery program 150 may analyze the amount of individuals consuming supplies at each location, calculate an overall order amount, split the order, and deliver the corresponding split orders to the appropriate location by a time needed for supply usage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, the method comprising:
    determining storage availability for an item at a current user location using IoT smart devices in the current user location;
    determining a usage rate of the item and disposal habits of the item by the user and other users at the current user location using the IoT smart devices;
    identifying a user purchasing habit for the item through an application programming interface with an enterprise loyalty application;
    calculating a splitting of a shipment of an order of the item into at least a first shipment of a first quantity of the order at a first date to a first location and a second shipment of a second quantity of the order at a second date to a second location based on a user consumption rate, a calculated usage time and date of each quantity, the determined usage rate, a shipping length, warehouse space, and current demand and future demand by the other users for an item in the order, wherein the first location is the current user location and the second location is a future user location, and wherein the calculating further comprises:
        calculating a modified usage rate of the item at the second location based on characteristics and amenities provided at the second location compared to characteristics and amenities available at the first location; and
    performing the first shipment at the first date and the second shipment at the second date according to the splitting.

2. The method of claim 1, wherein the first quantity and the second quantity are further based on available storage space for the quantity of the item at each location.

3. The method of claim 1, wherein identifying the future user location comprises connecting to one or more repositories containing user itinerary information corresponding to each location at which a user will stay and a length of time associated with each stay.

4. The method of claim 1, further comprising:
    generating, dynamically, multiple online shopping carts based on the shipment, wherein each online shopping cart corresponds to the first quantity and the second quantity of the item at each location on the first date and the second date for a respective split shipment based on the calculated usage time, the first date, and the second date.

5. The method of claim 1, wherein the first quantity and the second quantity are further based as a number of divisions of an online shopping cart, and wherein the number are selected from a group consisting of available manufacturer packaging sizes or amounts, warehouse storage space, overall current and/or predicted future consumer demand, current and/or future user location storage space, and current and/or future user location item inventory.

6. The method of claim 1, wherein the user consumption rate is identified through user purchase habits.

7. The method of claim 1, wherein the user consumption rate is identified through analysis of an Internet of Things (IoT) device feed.

8. A computer system, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
        determining storage availability for an item at a current user location using IoT smart devices in the current user location;
        determining a usage rate of the item and disposal habits of the item by the user and other users at the current user location using the IoT smart devices;
        identifying a user purchasing habit for the item through an application programming interface with an enterprise loyalty application;
        calculating a splitting of a shipment of an order of the item into at least a first shipment of a first quantity of the order at a first date to a first location and a second shipment of a second quantity of the order at a second date to a second location based on a user consumption rate, a calculated usage time and date of each quantity, the determined usage rate, a shipping length, warehouse space, and current demand and future demand by the other users for an item in the order, wherein the first location is the current user location and the second location is a future user location, and wherein the calculating further comprises:
            calculating a modified usage rate of the item at the second location based on characteristics and amenities provided at the second location compared to characteristics and amenities available at the first location; and
        performing the first shipment at the first date and the second shipment at the second date according to the splitting.

9. The computer system of claim 8, wherein the first quantity and the second quantity are further based on available storage space for the quantity of the item at each location.

10. The computer system of claim 8, wherein identifying the future user location comprises connecting to one or more repositories containing user itinerary information corresponding to each location at which a user will stay and a length of time associated with each stay.

11. The computer system of claim 8, further comprising:
    generating, dynamically, multiple online shopping carts based on the shipment, wherein each online shopping cart corresponds to the first quantity and the second quantity of the item at each location on the first date and the second date for a respective split shipment based on the calculated usage time, the first date, and the second date.

12. The computer system of claim 8, wherein the first quantity and the second quantity are further based as a number of divisions of an online shopping cart, and wherein the number are selected from a group consisting of available manufacturer packaging sizes or amounts, warehouse storage space, overall current and/or predicted future consumer demand, current and/or future user location storage space, and current and/or future user location item inventory.

13. The computer system of claim 8, wherein the user consumption rate is identified through user purchase habits.

14. The computer system of claim 8, wherein the user consumption rate is identified through analysis of an Internet of Things (IOT) device feed.

15. A computer program product, the computer program product comprising:
one or more computer-readable tangible storage medium and program instructions stored on at least one of the one or more tangible storage medium, the program instructions executable by a processor capable of performing a method, the method comprising:
determining storage availability for an item at a current user location using IoT smart devices in the current user location;
determining a usage rate of the item and disposal habits of the item by the user and other users at the current user location using the IoT smart devices;
identifying a user purchasing habit for the item through an application programming interface with an enterprise loyalty application;
calculating a splitting of a shipment of an order of the item into at least a first shipment of a first quantity of the order at a first date to a first location and a second shipment of a second quantity of the order at a second date to a second location based on a user consumption rate, a calculated usage time and date of each quantity, the determined usage rate, a shipping length, warehouse space, and current demand and future demand by the other users for an item in the order, wherein the first location is the current user location and the second location is a future user location, and wherein the calculating further comprises:
calculating a modified usage rate of the item at the second location based on characteristics and amenities provided at the second location compared to characteristics and amenities available at the first location; and
performing the first shipment at the first date and the second shipment at the second date according to the splitting.

16. The computer program product of claim 15, wherein the first quantity and the second quantity are further based on available storage space for the quantity of the item at each location.

17. The computer program product of claim 15, wherein identifying the future user location comprises connecting to one or more repositories containing user itinerary information corresponding to each location at which a user will stay and a length of time associated with each stay.

18. The computer program product of claim 15, further comprising:
generating, dynamically, multiple online shopping carts based on the shipment, wherein each online shopping cart corresponds to the first quantity and the second quantity of the item at each location on the first date and the second date for a respective split shipment based on the calculated usage time, the first date, and the second date.

19. The computer program product of claim 15, wherein the first quantity and the second quantity are further based as a number of divisions of an online shopping cart, and wherein the number are selected from a group consisting of available manufacturer packaging sizes or amounts, warehouse storage space, overall current and/or predicted future consumer demand, current and/or future user location storage space, and current and/or future user location item inventory.

20. The computer program product of claim 15, wherein the user consumption rate is identified through user purchase habits.

* * * * *